(12) United States Patent
Mahan et al.

(10) Patent No.: US 7,677,021 B2
(45) Date of Patent: Mar. 16, 2010

(54) REPLACEABLE REEL BLADE SYSTEM

(75) Inventors: Jonathan Dohme F. Mahan, Charlotte, NC (US); Vivek Moinikunta, Mecklenburg, NC (US); Lynn G. Westbrook, Lake Wylie, SC (US)

(73) Assignee: Textrons Innovations Inc., Providence, RI (US)

( * ) Notice: Subject to any disclaimer, the term of this patent is extended or adjusted under 35 U.S.C. 154(b) by 0 days.

(21) Appl. No.: 11/835,582

(22) Filed: Aug. 8, 2007

(65) Prior Publication Data

US 2009/0025356 A1 Jan. 29, 2009

Related U.S. Application Data

(60) Provisional application No. 60/952,024, filed on Jul. 26, 2007.

(51) Int. Cl.
*A01D 34/53* (2006.01)
(52) U.S. Cl. .......................................... 56/249; 56/294
(58) Field of Classification Search .................. 56/249, 56/251, 294, 289, 13.4
See application file for complete search history.

(56) References Cited

U.S. PATENT DOCUMENTS

| | | | | |
|---|---|---|---|---|
| 781,397 A | | 1/1905 | Brown | |
| 1,192,970 A | * | 8/1916 | Yank | 56/252 |
| 2,152,278 A | * | 3/1939 | Clemson | 56/249 |
| 2,266,308 A | | 12/1941 | Clemson | |
| 2,269,920 A | * | 1/1942 | Seaver | 56/249 |
| 2,557,897 A | * | 6/1951 | Sullivan | 56/289 |
| 2,790,294 A | | 4/1957 | Marich | |
| 2,805,537 A | * | 9/1957 | Sturgis | 56/249 |
| 2,869,310 A | | 1/1959 | Benson | |
| 3,054,247 A | * | 9/1962 | Roesler | 56/13.4 |
| 3,126,931 A | * | 3/1964 | Blanshine et al. | 241/55 |
| 3,144,745 A | * | 8/1964 | Sharps | 56/249 |
| 3,333,498 A | * | 8/1967 | Holm | 83/672 |
| 3,876,159 A | | 4/1975 | Kidd et al. | |
| 4,209,137 A | * | 6/1980 | McAllister et al. | 241/221 |
| 4,769,976 A | | 9/1988 | Bassett et al. | |
| 5,291,724 A | * | 3/1994 | Cotton | 56/251 |
| 5,477,666 A | * | 12/1995 | Cotton | 56/251 |
| 5,623,817 A | | 4/1997 | Bricko et al. | |
| 5,628,169 A | | 5/1997 | Stiller et al. | |
| 6,318,059 B1 | * | 11/2001 | Cotton | 56/251 |
| 6,889,491 B2 | | 5/2005 | Buchko | |
| 2006/0174602 A1 | * | 8/2006 | Mahan et al. | 56/249 |

* cited by examiner

*Primary Examiner*—Árpád Fábián-Kovács
(74) *Attorney, Agent, or Firm*—Harness, Dickey & Pierce, P.L.C.

(57) ABSTRACT

A reel mower assembly having a frame and a reel rotatably mounted to the frame. The reel is a casting having spatially separated end members and a plurality of cross members homogenously connected to the end members. One or more support rings can also be positioned between the end members and homogenously connected to the cross members. A drive is operable to rotate the reel about a reel axis.

22 Claims, 7 Drawing Sheets

*Fig-14*

REPLACEABLE REEL BLADE SYSTEM

CROSS-REFERENCE TO RELATED APPLICATIONS

This application claims the benefit of U.S. Provisional Application No. 60/952,024, filed on Jul. 26, 2007. The disclosure of the above application is incorporated herein by reference.

FIELD

The present disclosure relates to a reel mower, and more particularly, to a replaceable reel blade system for a reel mower.

BACKGROUND

Reel mowers use a scissoring action, rather than a tearing action, to shear grass and like foliage. Such reel mowers typically provide a high quality cut, but require more maintenance than rotary mowers. Golf course superintendents prefer such mowers where appearance and healthy grass are important, such as on golf greens.

In a typical reel mower assembly, an attachment member, commonly called a bedbar or backer, attaches to the apparatus in rigid relationship to the reel, and a replaceable bedknife attaches to the bedbar. The bedknife is maintained parallel to the reel axis and in close proximity to the reel knives so that the reel and the bedknives achieve a quality sheering action. Typically, an adjustment mechanism allows movement of the bedbar relative to the reel so that the bedknife can be moved into proper relationship with the rotating reel.

More specifically, conventional reel blade systems include a reel that is supported for rotation about a fixed axis. The reel is operably coupled to a power device, such as an electric motor, internal combustion motor, or manual gear system, which serves to rotatably drive the reel relative to a fixed bedknife. The bedknife is typically attached to a bedbar with a plurality of screws placed through holes in the bedknife and into engagement with threaded holes formed in the bedbar. A reel mower unit used in a typical golf course application may use multiple reel mower assemblies.

Conventional reels often present many challenges for manufacture because of their complex assembly of multiple components that require extensive machining and/or welding. For instance, conventional reel assemblies require a shaft, a plurality of spiders welded to and extending from the shaft within a predetermined tolerance, and a plurality of blades fixedly coupled to the plurality of spiders. The shaft, spiders, and blades are further machined to facilitate coupling with additional mower components and each other. As a result of the need to weld various portions of the reel assembly, the maximum blade material hardness is limited. Furthermore, it should be appreciated that as a result of such complex manufacturing steps, the complexity and resultant costs are increased.

During operation, reel assemblies are often subjected to damaging debris, such as stones and the like, debris sometimes jams between the fixed bedknife and the rotating reel. Consequently, damage to one or more portions of the reel mower assembly may result. Reels may also sustain damage when contacting a substantially buried obstruction. Damage to the reel can be quite costly and problematic, given the close tolerances required for proper operation. Furthermore, a reel tends to wear the more often it is used, thereby requiring skilled and costly adjustment of the bedknife relative to the reel.

SUMMARY

The present disclosure relates to a reel mower assembly comprising a frame and a reel rotatably mounted to the frame. The reel includes a plurality of cross members connected with a reel shaft. A drive is operable to rotate the reel about a reel axis. A blade member is removably coupled to one of the plurality of cross members to prevent movement of the blade member with respect to the cross member, yet permit easily replacement thereof. The blade member may be removably coupled to one of the plurality of cross members according to any one of a number of methods disclosed herein, such as through a magnetic interface, an adhesive interface, an interference fit, a tongue and groove fit, or conventional fasteners.

According to several embodiments, a reel for use in a reel mower assembly includes a casting having spatially separated end members and at least two helically shaped cross members homogenously connected to the end members.

According to further embodiments, a reel mower assembly includes a frame and a casting defining a reel rotatably mounted to the frame. The reel includes spatially separated cylindrical shaped end members, and a plurality of helically shaped cross members homogenously connected to the end members. Each of the cross members includes a cutting edge created at a free end of the cross members.

According to still further embodiments, a cast reel for use in a reel mower assembly includes a stainless steel casting having spatially separated cylindrical-shaped end members and at least two helically shaped cross members homogenously connected at opposed cross member ends to the end members. At least one support ring of the casting is positioned between the end members and is homogenously connected to the cross members. A cutting edge is created on a radial free end of the cross members. A relief edge is created proximate to the cutting edge on each of the cross members. First and second shaft bearing members are each connected to one of the end members. The first and second shaft bearing members together define a reel longitudinal axis.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The drawings described herein are for illustration purposes only and are not intended to limit the scope of the present disclosure in any way.

DETAILED DESCRIPTION

The following description of the preferred embodiments is merely exemplary in nature and is in no way intended to limit the disclosure, its application, or uses. It should be understood that throughout the drawings, corresponding reference numerals indicate like or corresponding parts and features.

Figure 1:
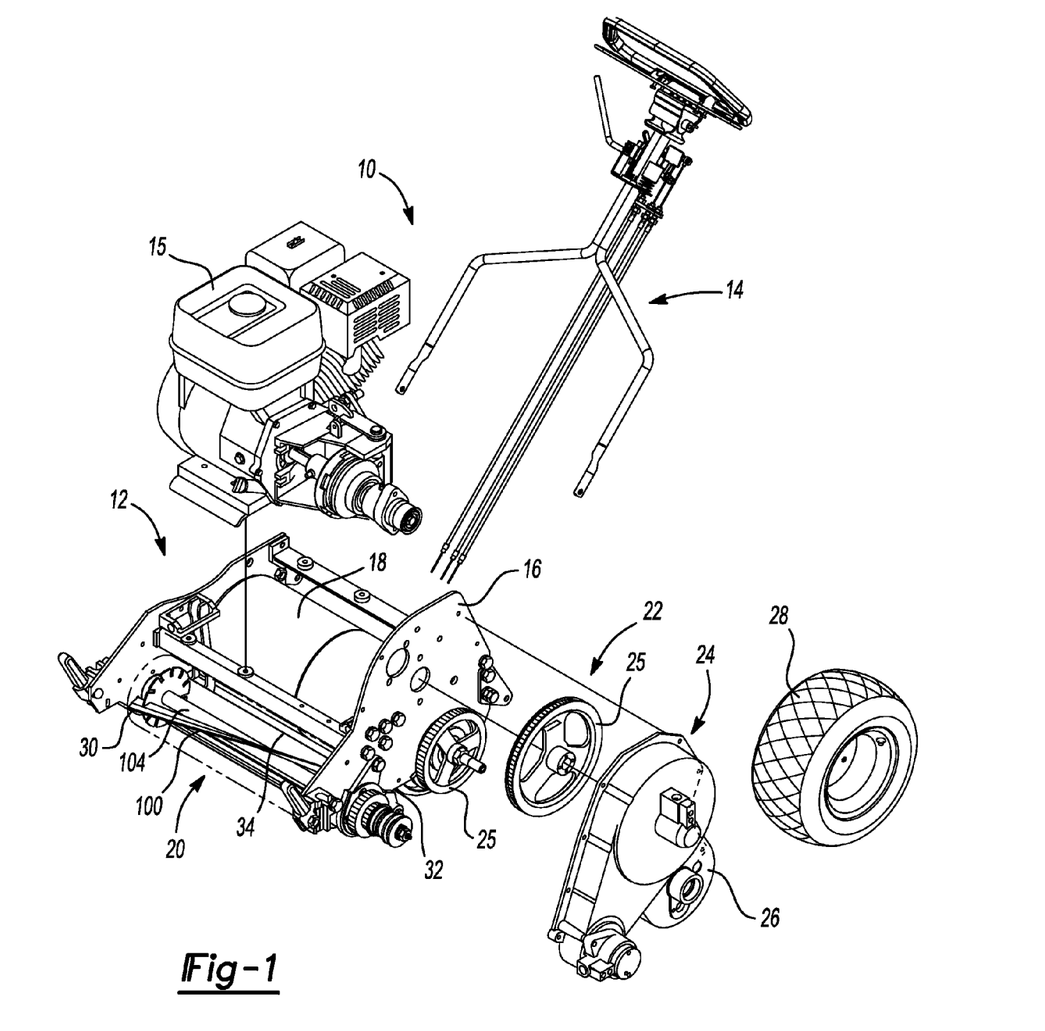
FIG. 1 is an exploded perspective view of a walk-behind reel mower incorporating the replaceable reel blade system of the present disclosure.

FIG. 1 shows the basic components of a mower 10 constructed in accordance with the present disclosure. Mower 10 is shown as a walk-behind mower; however, mower 10 can be any variety of reel-type greens mowers, including single, multiple walk-behind, stand-behind, and riding reel-type mowing devices. Mower 10 includes cutting unit 12, which comprises a power source or engine 15 coupled to a frame 16, and a handle 14 coupled to frame 16. A traction roller 18 is rotatably coupled to frame 16 and drivingly connected to an engine 15. Cutting unit 12 further includes a reel mower assembly 20, described in detail with respect to FIGS. 2-5. A transmission 22 includes within a housing 24 a plurality of sprockets 25 selectively transferring rotational output torque of engine 15 to traction roller 18. Transmission 22 includes a clutch 26 positioned intermediate engine 15 and transmission 22. Clutch 26 operates in an engaged and disengaged mode for selectively transferring power from engine 15 to traction roller 18. Wheels 28 are coupled to traction roller 18 and are also selectively driven by engine 15 to provide motive force for translating walk-behind greensmower 10, typically during a transportation mode of operation.

Reel mower assembly 20 includes a mower reel 30 mounted to frame 16 to enable relative rotational movement. Reel mower assembly 20 is commonly found on various types of mowers, including riding mowers and walk-behind mowers. A drive rotates reel 30 about a reel axis A. A bedbar 32 attaches to frame 16 and bedknife 34 attaches to bedbar 32. Typically, reel 30 further includes an adjustment mechanism to vary the position of bedbar 32 with respect to reel 30 in order to provide the proper cutting relationship between bedknife 34 and reel 30.

With reference to FIGS. 2-5, it can be seen that each of the embodiments of reel 30 has certain features that are generally common to each other. Specifically, with reference to FIGS. 2 and 3, reel 30 includes a circular array of cutting blades 100 arranged generally in a helix with the axis of rotation of reel 30 being coaxial with the axis for each blade helix. In order to properly position each cutting blade 100 at this predetermined helical position, a plurality of helically-arranged backers or blade supports 102 are provided for mounting cutting blades 100 thereto. The particular mounting method of cutting blade 100 to blade supports 102 will be discussed in detail below. Blade supports 102 are mounted to or formed integrally with a reel shaft 104. However, it should be understood that reel shaft 104 may have additional shafts (not shown) fixed within ends thereof for mounting with frame 16. These additional shafts may be threaded or press-fit into connection with reel shaft 104.

Figure 4:
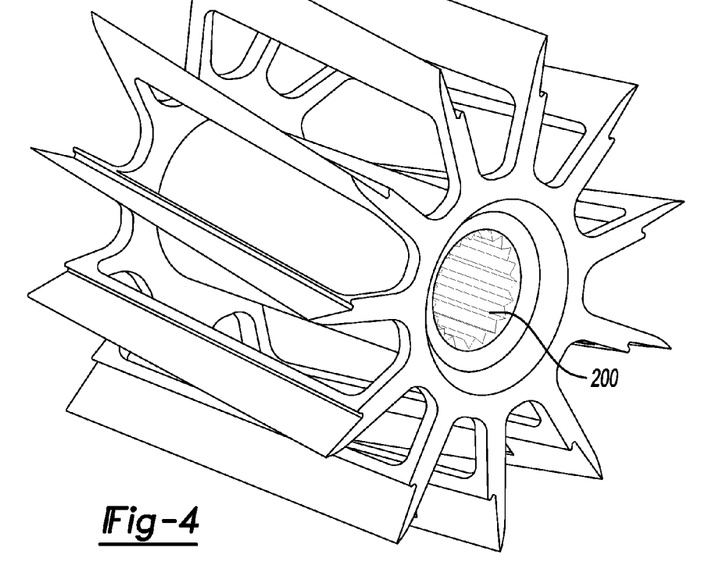
FIG. 4 is a perspective view of the replaceable reel blade system of another embodiment of the present disclosure.

Reel 30 is preferably provided in relatively-short length sections, such as for instance about 4-5". These shorter reel sections are disposed in an end-to-end arrangement to provide any one of a number of desirable final lengths, such as for instance 16", 20", 24", 28", and 32". These short reel sections may be coupled together according to any one of a number of known methods. For example, as seen in FIG. 4, reel 30 may include a splined surface 200 disposed within reel shaft 104. Splined surface 200 is adapted to engage a support shaft (not shown) having a corresponding splined surface for rotation therewith. The support shaft may be operably coupled to sprockets 25 of transmission 22 to rotatably drive reel 30.

These relatively-short length sections provide improvements in manufacturing in that they simplify the casting process. As is known, large intricate castings may be difficult to cast due to fluid flow limitations. To this end, it is anticipated that such shorter reel shafts may be threadedly engaged with each other to provide both a bearing support and a power transmission capability. However, it should be understood that longer length sections may also be manufactured according to more recent casting processes.

According to the present disclosure, reel 30 includes blade supports 102 mounted onto or formed integrally with reel shaft 104. In the case that blade supports 102 are mounted on reel shaft 104, blade supports 102 may be locked into position relative to the reel shaft using locking fasteners or any other known method or device. The blade supports rotate together with the reel shaft and are maintained in this fixed relative position via the use of a keyway; a square, hex, or octagonal shaped reel shaft and correspondingly shape feature on the blade supports; or by using a retaining compound to fixedly couple the blade supports to the reel shaft.

Figure 2:
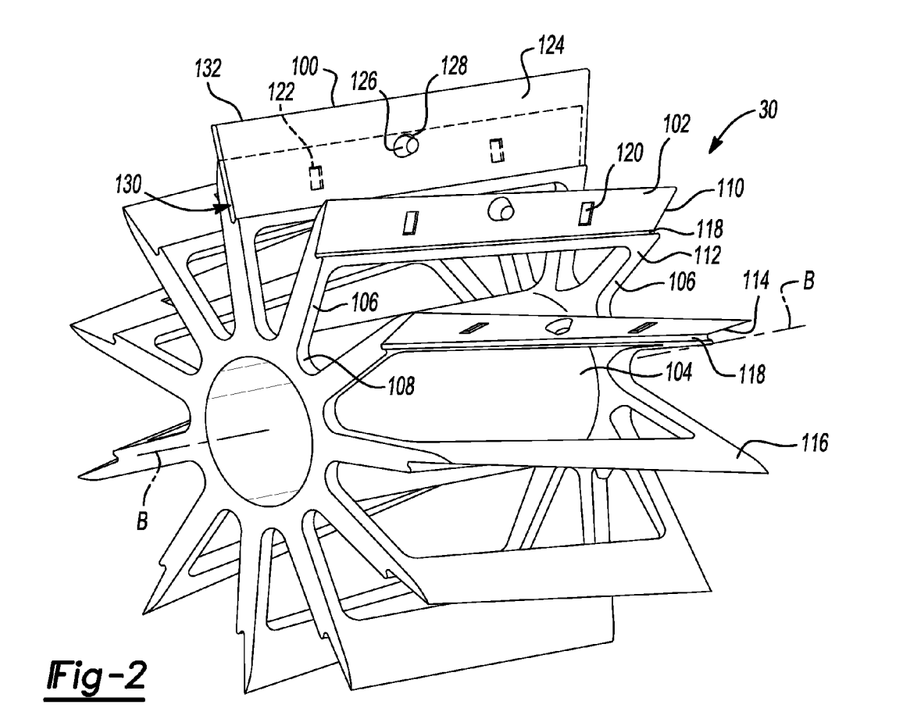
FIG. 2 is a perspective view of the replaceable reel blade system of one embodiment of the present disclosure.
Figure 3:
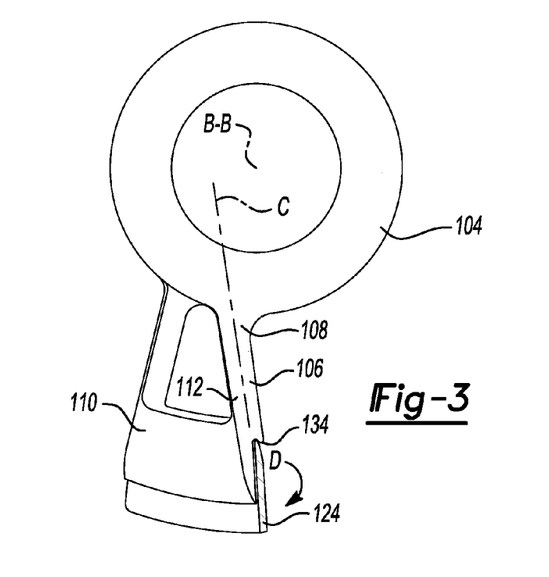
FIG. 3 is a side view of the replaceable reel blade system of FIG. 2.

As described above and with reference to FIGS. 2 and 3, reel 30 is shown having an integrally-formed (casted) reel shaft 104 and a plurality of blade supports 102. More particularly, reel shaft 104 is generally cylindrically-shaped and defines a central axis B-B. The plurality of blade supports 102 each have a pair of depending legs 106 integrally formed with reel shaft 104 at a proximal end 108 thereof. Legs 106 radiate outwardly from reel shaft 104. However, as best seen in FIG. 3, legs 106 are inclined such that an axis C of each leg 106 is not aligned with central axis B-B of reel shaft 104. A cross member 110 is further integrally formed with a distal end 112 of the pair of depending legs 106 to bridge the pair of legs 106. As seen in FIG. 2, legs 106 are further arranged such that cross members 110 form a helical arrangement relative to central axis B-B.

Still referring to FIGS. 2 and 3, cross member 110 defines a front face 114, a back face 116, and a blade groove 118. Front face 114 further includes a plurality of magnet pockets 120 formed therein. Each magnet pocket 120 is generally a recess appropriately sized to receive a magnet 122 therein. Magnets 122 are further appropriately sized to engage and retain a removable blade member 124 during operation. In other words, magnets 122 must have appropriate retaining capability to prevent the inadvertent disengagement of blade member 124 from cross member 110 during operation.

To further prevent the inadvertent disengagement of blade member 124 relative to cross member 110 or the possible misalignment of blade member 124 relative to bedknife 34, cross member 110 further includes at least one centripetal force pin 126. Centripetal force pin 126 is sized to be received within an aperture 128 formed in blade member 124. Centripetal force pin 126 and aperture 128 cooperate to prevent the inadvertent outward movement of blade member 124 relative to cross member 110 in response to centripetal force during high-speed rotation of reel 30.

Blade groove 118 of cross member 110 further serves to ensure the proper positioning of blade member 124 relative to cross member 110 and consequently bedknife 34. As best seen in FIG. 3, blade groove 118 is generally U-shaped and sized to receive a proximal end 130 of blade member 124 therein. U-shaped blade groove 118 generally surrounds a portion of blade member 124 to prevent blade member 124 from pivoting out of engagement with blade groove 118 in direction D (FIG. 3). In other words, blade groove 118 serves to counteract the force applied to distal end 132 (cutting end) of blade member 124 during cutting. A lip 134 of blade groove 118 engages distal end 132 of blade member 124 to maintain the proper positioning of blade member. Furthermore, the longitudinal arrangement of blade groove 118 serves to further prevent the inadvertent twisting of blade member 124 about centripetal force pin 126.

With particular reference to FIG. 3, it can be seen that front face 114 further serves to support blade member 124 from twisting or pivoting during operation in that front face 114 extends along a large portion of blade member 124. Thus, forces exerted upon blade member 124 are transferred directly to front face 114 of cross member 110 and finally to reel shaft 104.

During operation, blade member 124 will be in proper cutting relationship with bedknife 34 to achieve the desired level of cut. However, as can be appreciated, during use blade member 124 will eventually wear to a point requiring replacement. To facilitate this replacement, the present disclosure provides a simple method, specifically a user may replace blade members 124 simply by pivoting blade members 124 about blade groove 118 against the magnetic force of magnets 122. Once blade members 124 are removed from cross member 110, replacement blade members may be quickly inserted into blade groove 118 and rotated into magnetic locking engagement with magnets 122 and alignment with centripetal force pin 126.

Figure 5:
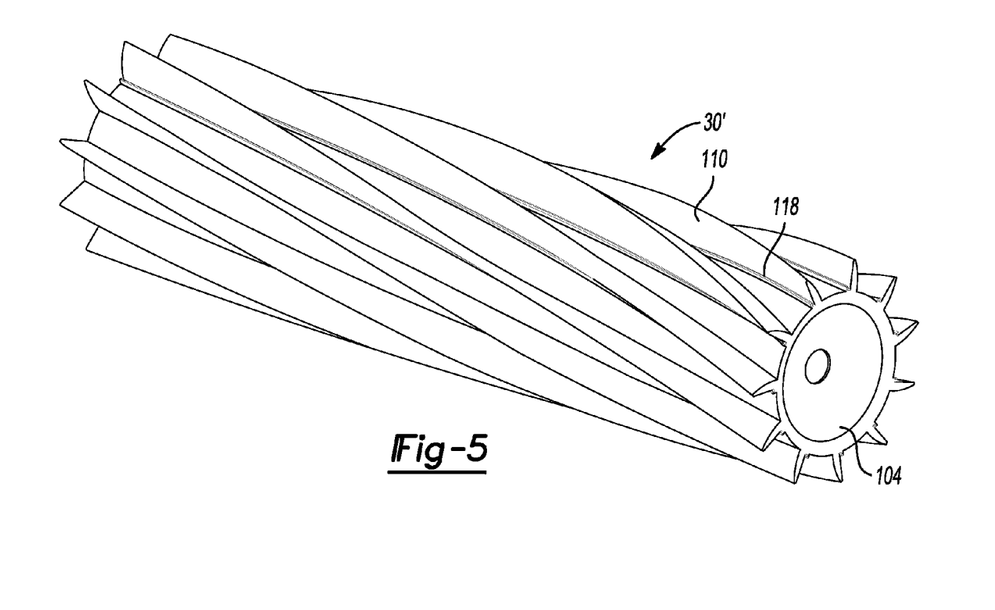
FIG. 5 is a perspective view of the replaceable reel blade system of yet another embodiment of the present disclosure.

It should be understood that alternative embodiments may be used to achieve the principles of the present disclosure. With particular reference to FIG. 5, it should be understood that the reel, generally referenced as 30', may have a solid-construction. That is, reel 30' may include a generally solid reel shaft 104' and a plurality of cross members 110 formed integrally therewith, without the need for legs 106. However, it is anticipated that such arrangement would still include a removable blade member 124 fixedly coupled to cross member 110.

Likewise, it is anticipated that alternative mounting methods may be used to coupled blade member 124 to cross member 110 in addition to the aforementioned magnetic attachment method. For example, it should be understood that blade member 124 may be removably coupled to cross member 110 using an interference fit arrangement between centripetal force pin 126 and blade groove 118. That is, the distance between centripetal force pin 126 and blade groove 118 may be smaller than a distance between proximal end 130 of blade member 124 and aperture 128. Therefore, during assembly, blade member 124 may be inserted into blade groove 118 and rotated into position such that a preload on blade member 124 is required to engage centripetal force pin 126 within aperture 128. This interference fit would then retain blade member 124 in engagement with cross member 110 without requiring magnets 122.

Additionally, an adhesive material may be used to coupled blade member 124 to front face 114 of cross member 110. Such adhesive material, such as Loctite®, may be used to properly position and retain blade member 124 within blade groove 118. In this regard, both magnet 122 and centripetal force pin 126 may be eliminated. The adhesive material may be releasable upon application of heat.

Still further, blade member 124 may be coupled to cross member 110 using standard fasteners disposed between blade member 124 and cross member 110. To this end, both magnet 122 and centripetal force pin 126 may again be eliminated.

Figures 6, 7, 8:
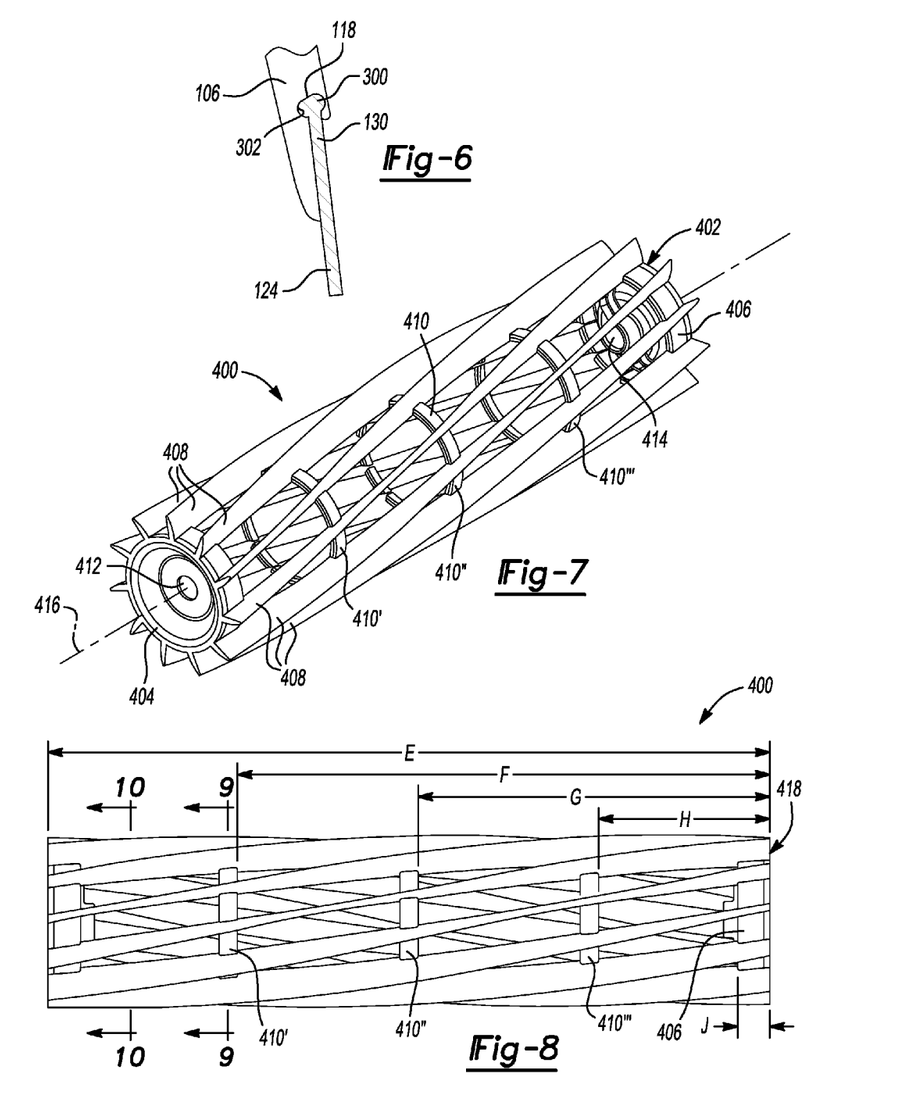
FIG. 6 is a side view of the replaceable reel blade system illustrating a tongue and groove engagement system.
FIG. 7 is a perspective view of a cast reel blade of several embodiments of the present disclosure.
FIG. 8 is a side elevational view of the cast reel of FIG. 7.

As seen in FIG. 6, blade member 124 may be coupled with cross member 110 using a tongue and groove arrangement. Specifically, blade member 124 may include a tongue 300 extending from proximal end 130 that is sized to be received within an ancillary groove portion 302 formed in blade groove 118. This could permit blade member 124 to be easily slid or rotated into position and retained reliably relative to cross member 110.

Referring to FIG. 7, according to several embodiments of the present disclosure a reel 400 for use in a reel mower assembly is a one-piece casting defining a cast body 402 having spatially separated first and second end members 404, 406 and at least two spirally or helically shaped cross members 408 homogenously connected to the end members 404, 406. At least one support ring 410 can be positioned between the end members 404, 406, and in the embodiment shown three support rings 410', 410", and 410'" are used. The cross members 408 are also homogenously connected to each of the support rings 410. An aperture 412 can be created in first end member 404 and an axially aligned aperture 414 can be created in second end member 406. Apertures 412 and 414 are coaxially aligned on a longitudinal axis 416 of reel 400 which also defines an axis of rotation of reel 400.

Referring to FIG. 8, the support rings 410 can be non-equally or equidistantly spaced from each other to provide intermediate support for the cross members 408. In the embodiment shown, a center of each of the three support rings 410', 410", and 410'" is positioned at intervals of approximately one fourth of a total length "E" of reel 400. In this embodiment, an edge of support ring 410' is positioned at a distance "F", an edge of support ring 410" is positioned at a distance "G", and an edge of support ring 410'" is positioned at a distance "J" from an end face 418 of reel 400. In one embodiment of reel 400 having a total length "E" of 22 in. (55.88 cm), dimension "F" is approximately 16.22 in. (41.21 cm), dimension "G" is approximately 10.72 in. (27.23 cm), and dimension "H" is approximately 5.22 in. (13.26 cm). Each of the end members 404, 406 have a width "J", which is approximately 1.0 in. (2.54 cm) in the embodiment having a total length "E" of 22 inches (55.88 cm). The total length "E", and the quantity and spacing of the support ring(s) 410 can also vary within the scope of the present disclosure.

Figure 9:
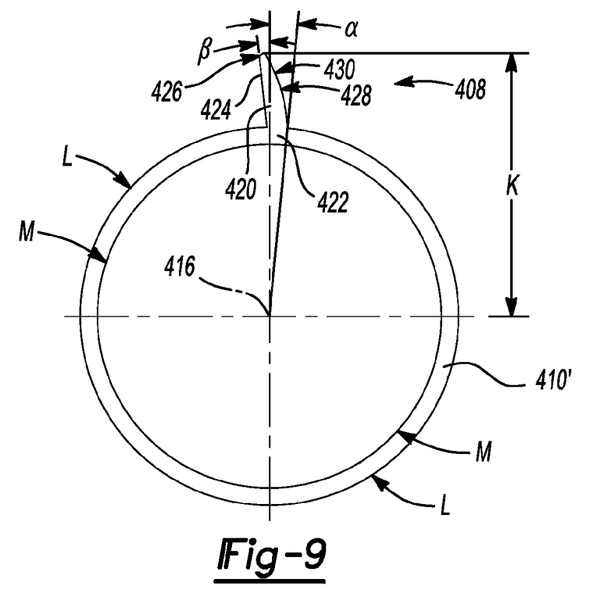
FIG. 9 is a partial cross sectional end elevational view taken at section 9 of FIG. 8.

Referring to FIG. 9, in several embodiments, the cross members 408 each define a blade 420 having a base 422 and a tip 424, wherein the base 422 can be wider than the tip 424. Each base 422 defines a portion of cross member 408 which is homogenously connected to the first and second end members 404, 406 (not shown in this view) and each of the support rings 410 (shown). The tip 424 can extend radially outward with respect to both the end members 404, 406 and the support rings 410. Each of the cross members 408 can also include a cutting edge 426 as-cast, ground or otherwise created to define a free end of the tip 424. Each of the cross members 208 has a total height "K" measured with respect to the longitudinal axis 416. An angle α is defined between a rear face 428 junction with each support ring 410 and a rear corner of cutting edge 426. An angle β is defined between the rear corner of cutting edge 426 to a front corner of cutting edge 426. In several embodiments, angle α is approximately 7.0 degrees and angle β is approximately 6.0 degrees, although these angles can vary within the scope of the present disclosure. A relief face 430 can also be created for example by grinding a portion of rear face 428 proximate to cutting edge 426. As also shown in FIG. 9, the support rings 410 further include an external diameter "L" and an internal diameter "M".

Figure 10:
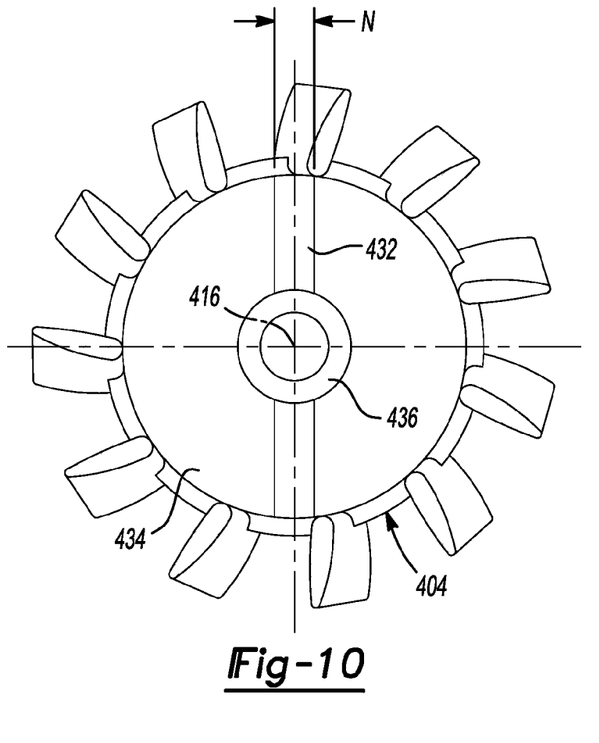
FIG. 10 is a partial cross sectional end elevational view taken at section 10 of FIG. 8.

Referring to FIG. 10, a reinforcing rib 432 can be created on an inner face 434 of the end members 404, 406 (only end member 404 is shown). The reinforcing ribs 432 have a total width "N". Each reinforcing rib 432 stiffens the inner face 434 in an area of a bearing sleeve or member 436 also created on inner face 434 and axially positioned with respect to longitudinal axis 416. The purpose of bearing member 436 will be described in reference to FIG. 13.

Figure 11:
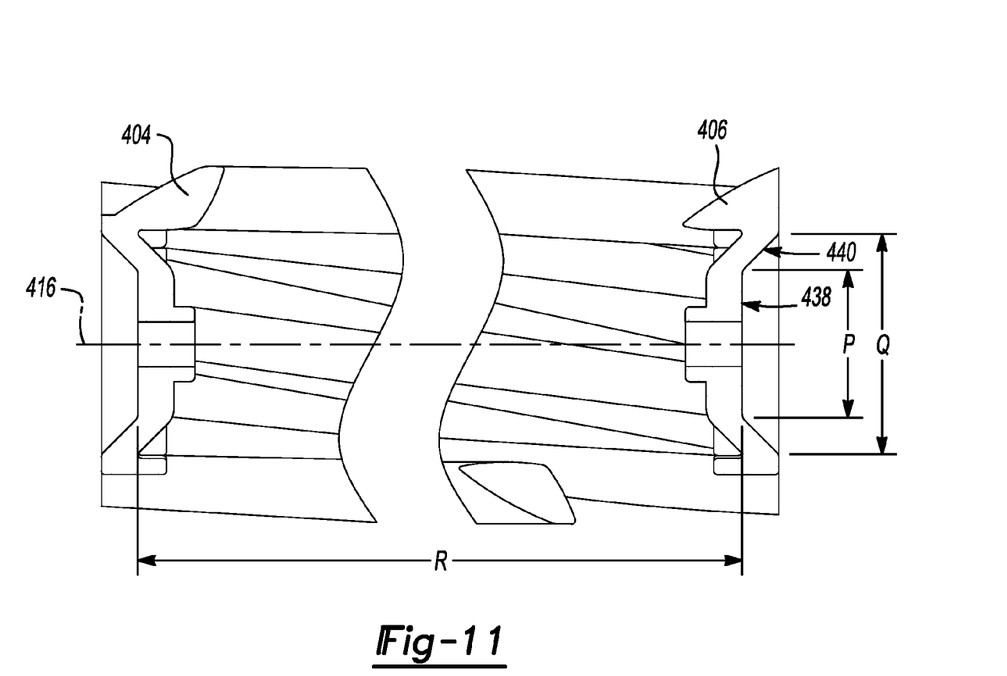
FIG. 11 is a partial cross sectional side elevational view of the cast reel blade of FIG. 7.

Referring to FIG. 11, each of the end members 404, 406 can include a flat surface 438 through which apertures 412, 414 are created. Flat surface 438 has a diameter "P" which according to several embodiments is approximately 2.08 in. (5.28 cm). A conical surface 440 can also extend outwardly from flat surface 438 and in several embodiments has a major diameter "Q" of approximately 3.19 in. (8.10 cm). A total distance "R" is controlled between flat surfaces 438 of each of the end members 404, 406.

Figure 12:
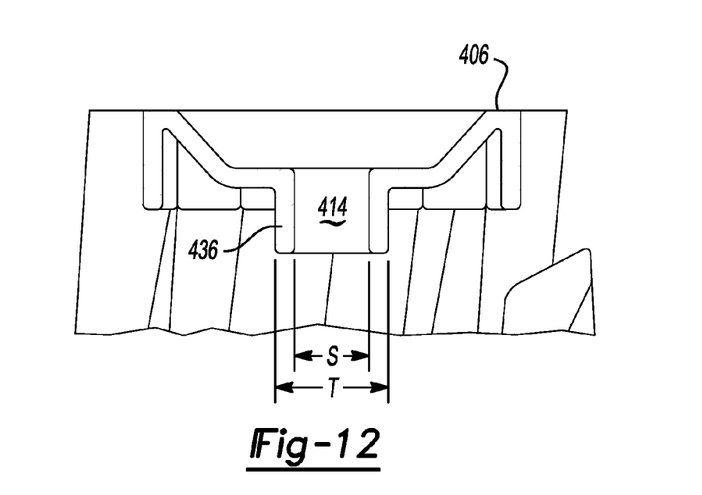
FIG. 12 is a cross sectional elevational view of one of the end members of the cast reel blade of FIG. 7.

With reference to FIG. 12, apertures 412, 414 (only aperture 414 is shown) can vary in diameter from each other or each have a common diameter "S". Shaft bearing sleeves 436 homogenously connected to each of the end members 404, 406 can have an outer diameter "T" and are axially aligned together with apertures 412, 414 with respect to reel longitudinal axis 416.

Figure 13:
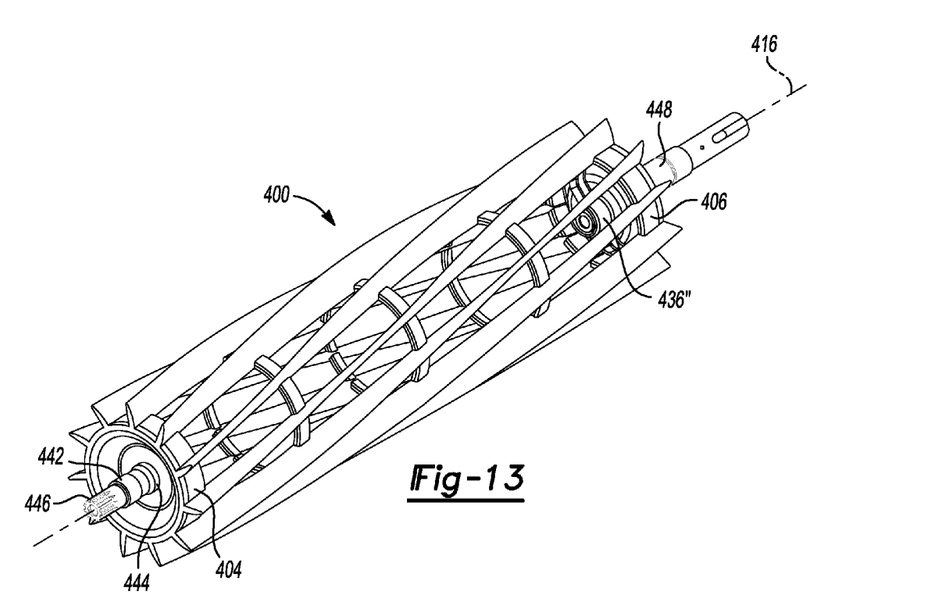
FIG. 13 is a perspective view of an assembly having a cast reel blade and rotation shafts of the present disclosure.

Referring now to FIGS. 1 and 13, according to several embodiments reel 400 can be rotatably connected to frame 16 using a first shaft 442 which is received in a first one of the shaft bearing members 436' (not clearly visible in this view). First shaft 442 can be fixed using a fixing end 444 to first shaft bearing member 436' for example by interference fit, welding, spline gear, or similar fixing method. First shaft 442 can also provide at a free end a positive engagement feature or element 446, which in several embodiments is a spline connection adapted to be positively engaged for rotation by the drive connected to transmission 22. The drive is operative to rotate reel 400 about longitudinal axis 416.

Reel 400 can be further rotatably connected to frame 16 using a second shaft 448 which can be rotatably received in a second one of the shaft bearing members 436" of end member 406. Both the first and second shafts 442, 448 are centrally disposed on reel longitudinal axis 416. Although the first shaft 442 is fixedly engaged to the first shaft bearing member 436', the second shaft 448 can be either fixedly or rotatably connected to the second shaft bearing member 436". The mechanical end connections of first and second shafts 442 and 448 can also include threaded end connections adapted to be threadably received at the end members 404, 406 of the cast body 402.

Figure 14:
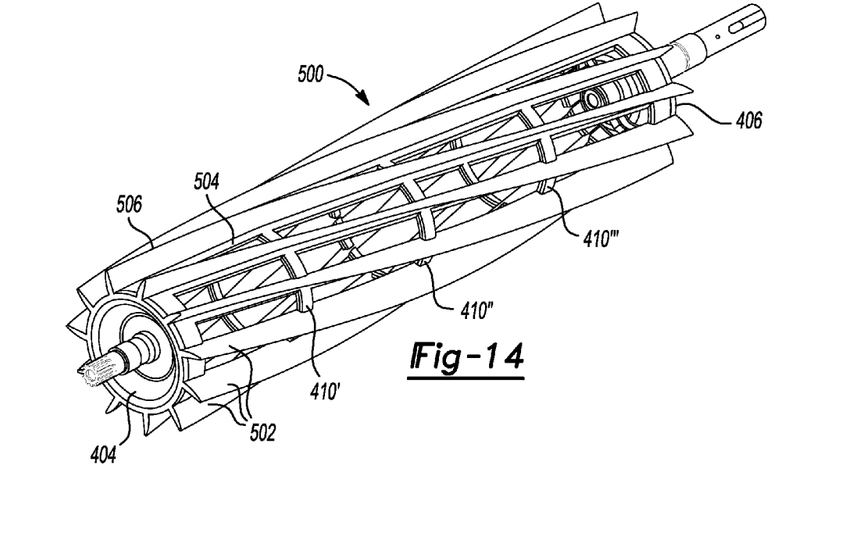
FIG. 14 is a perspective view of another embodiment of a cast reel blade of the present disclosure.

Referring to FIG. 14, according to further embodiments, a cast reel 500 is modified from reel 400 to include a plurality of cross members 502 which are modified from cross members 408. Each of the cross members 502 define an L-shape to increase their structural rigidity and have a flange portion 504 homogenously connected to the end members 404, 406 and each of the support rings 410', 410", and 410'". Cross members 502 also include a leg portion 506 freely extending outwardly with respect to the end members 404, 406 and the support rings 410. Leg portions 506 are also homogenously connected to the end members 404, 406 and each of the support rings 410', 410", and 410'". The flange portion 504 of the cross members 502 provide additional longitudinal stiffness which reduces end-to-end and rotational deflection of reel 500.

Cast reels 400, 500 of the present disclosure can be made from a metal such as steel including but not limited to a castable carbon steel, or a castable stainless steel material. The castable stainless steel material can include a CA-15 or a CA-40 grade stainless steel. The first and second shafts 442, 448 can also be made of a metal, but can also be selected from a material different from the castable material of the reels adapted for rotational bearing surfaces. Reels 400, 500 can be manufactured in lengths differing from the 22 inch (55.88 cm) length identified herein including both shorter and longer lengths, can be provided in multiple reel diameters, can include one or more cross members or blades 408, 502, and can include one or more than one support ring 410.

For these reasons, it is believed that the present disclosure provides a number of advantages over the prior art and further provides a simple and convenient method replacing worn reel cutting blades.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A reel for use in a reel mower assembly, the reel comprising a casting having spatially separated end members defining an open gap between said end members, said end members both including a mechanism for receiving a shaft for connecting the reel to a driving member such that said open gap between said end members is devoid of the shaft and at least two helically shaped cross members spanning said open gap and homogenously formed with the end members, said cross members being spaced from one another forming channels between said cross members, said channels extending into and continuous with said open gap between said end members such that said cross members are devoid of support members radiating from the open gap between said end members.

2. The reel of claim 1, further comprising at least one support ring positioned between the end members, the at least two cross members also homogenously formed with the at least one support ring along a circumference of the support ring, said at least one support ring dividing said channels, said at least one support ring positioned outside of said open gap and being devoid of support radiating from the open gap.

3. The reel of claim 2, wherein the at least two cross members each define a blade having a base and a tip, the base being wider than the tip, the base homogenously connected to the end members and the at least one support ring.

4. The reel of claim 3, wherein each of the cross members includes a cutting edge created at a free end of the tip.

5. The reel of claim 2, wherein the cross members each define an L-shape having a flange portion homogenously connected to the end members and the at least one support ring, and a leg portion freely extending outwardly with respect to the end members and the at least one support ring.

6. The reel of claim 1, further comprising first and second bearing members each connected to one of the end members for receiving a shaft, the first and second bearing members together defining a reel longitudinal axis.

7. The reel of claim 6, further comprising first and second shafts the first shaft received in the first bearing member and the second shaft received in the second bearing member, both the first and second shafts centrally disposed on the reel longitudinal axis.

8. The reel of claim 7, wherein the first shaft is fixedly engaged to the first bearing member, the first shaft further including a positive engagement feature adapted to engage a torque transmitting member of the reel mower assembly.

9. A reel mower assembly, comprising:
a frame; and
a casting defining a reel rotatably mounted to the frame, the reel including:
spatially separated cylindrical shaped end members defining an open gap between said end members, said end members both including a mechanism for receiving a shaft for connecting the reel to a driving member such that said open gap between said end members is devoid of the shaft; and
a plurality of helically shaped cross members spanning said open gap and homogenously formed with the end members, said cross members being spaced from one another forming channels between said cross members, said channels extending into and continuous with said open gap between said end members such that said cross members are devoid of support members radiating from the open gap between said end members, each of the cross members including a cutting edge created at a free end of the cross members.

10. The reel mower assembly of claim 9, further comprising first and second mechanical end connections each fixedly connected to one of the end members, the end connections defining a longitudinal axis of the reel.

11. The reel mower assembly of claim 10, further comprising a drive operative to rotate the reel about the longitudinal axis of the reel.

12. The reel mower assembly of claim 9, further comprising first and second shafts each engageable with the first or second mechanical end connections, the drive being connectable to one of the shafts to rotate the reel.

13. The reel mower assembly of claim 10, wherein the mechanical end connections each comprise threaded end connections adapted to be threadably received at the end members of the cast body.

14. The reel mower assembly of claim 10, wherein the mechanical end connections each comprise a press-fit connection adapted to be press-fit to the end members of the cast body.

15. The reel mower assembly of claim 9, wherein each of the helically shaped cross members includes a ground back side located proximate to the cutting edge.

16. The reel mower assembly of claim 9, wherein the reel comprises a castable stainless steel material.

17. The reel mower assembly of claim 9, wherein the reel further comprises at least one support ring positioned between the end members, the at least two cross members also homogenously connected to the at least one support ring.

18. A cast reel for use in a reel mower assembly, the reel comprising:
a steel casting having:
spatially separated cylindrical-shaped end members defining an open gap between said end members, said end members both including a mechanism for receiving a shaft for connecting the reel to a driving member such that said open gap between said end members is devoid of the shaft and at least two helically shaped cross members spanning said open gap and homogenously formed at opposed cross member ends to the end, said cross members being spaced from one another forming open channels between said cross members, said channels extending into and continuous with said open gap between said end members;
at least one support ring of the casting positioned between the end members and homogenously formed with the cross members such that the cross members are supported along a circumference of said at least one support ring, said at least one support ring devoid of support members radiating from the open gap between said end members;
a cutting edge created on a radial free end of the cross members; and
a relief edge proximate to the cutting edge on each of the cross members; and
first and second bearing members each connected to one of the end members, the first and second bearing members together defining a reel longitudinal axis.

19. The cast reel of claim 18, further comprising first and second shafts, the first shaft received in said first bearing member and the second shaft received the second bearing member, both the first and second shafts centrally disposed on the reel longitudinal axis.

20. The cast reel of claim 19, further comprising a pin adapted to fixedly connect the first shaft to the first one of the shaft bearing members.

21. The cast reel of claim 18, wherein the steel casting comprises a carbon steel.

22. The cast reel of claim 18, wherein the steel casting comprises a stainless steel.

* * * * *

UNITED STATES PATENT AND TRADEMARK OFFICE
CERTIFICATE OF CORRECTION

| | |
|---|---|
| PATENT NO. | : 7,677,021 B2 |
| APPLICATION NO. | : 11/835582 |
| DATED | : March 16, 2010 |
| INVENTOR(S) | : Jonathan Dohme F. Mahan et al. |

Page 1 of 1

It is certified that error appears in the above-identified patent and that said Letters Patent is hereby corrected as shown below:

Title page, under Assignee: "Textrons Innovations Inc." should be --Textron Innovations Inc.--.

Column 3, line 41 (application page 7, line 8), "greensmower" should be --greens mower--.

Column 8, line 53 (application page 3, line 4), "cuffing" should be --cutting--.

Column 10, line 37 (application page 7, line 12), insert "in" after received.

Signed and Sealed this

Twenty-second Day of June, 2010

David J. Kappos
*Director of the United States Patent and Trademark Office*